United States Patent [19]

Van Duyn

[11] Patent Number: 4,707,769
[45] Date of Patent: Nov. 17, 1987

[54] VEHICLE HEADLAMP ASSEMBLY
[75] Inventor: Paul D. Van Duyn, Anderson, Ind.
[73] Assignee: General Motors Corporation, Detroit, Mich.
[21] Appl. No.: 880,090
[22] Filed: Jun. 30, 1986
[51] Int. Cl.$^4$ .......................... B60Q 1/06; F21V 3/18
[52] U.S. Cl. ........................................ 362/66; 362/80; 362/226; 362/372
[58] Field of Search ................... 362/66, 69, 253, 368, 362/457, 226, 372

[56] References Cited

U.S. PATENT DOCUMENTS

| | | | |
|---|---|---|---|
| 3,752,976 | 8/1973 | Di Salvo et al. | 240/41.6 |
| 3,823,314 | 7/1974 | Germany | 240/41.6 |
| 3,878,389 | 4/1975 | Puyplat | 240/41.35 |
| 3,932,837 | 1/1976 | Baker | 240/41.6 |
| 4,118,655 | 2/1980 | Tallon et al. | 362/80 |
| 4,196,459 | 4/1980 | Dick | 362/66 |
| 4,306,276 | 12/1981 | Dick | 362/66 |
| 4,318,162 | 3/1982 | Sip | 362/226 |
| 4,333,131 | 6/1982 | Hujimoto et al. | 362/372 |

FOREIGN PATENT DOCUMENTS 1427387 4/1972 United Kingdom .

Primary Examiner—Larry Jones
Attorney, Agent, or Firm—Edward J. Biskup

[57] ABSTRACT

A vehicle headlamp assembly includes a box-like support frame enclosing a rectangular lamp body mounted adjustably with the lower corners of the lamp body supported by the frame by a pair of movable ball and socket members between which is located a pivot means that allows movement of the lamp body about a vertical axis and a horizontal axis but does not serve as a load bearing member.

3 Claims, 11 Drawing Figures

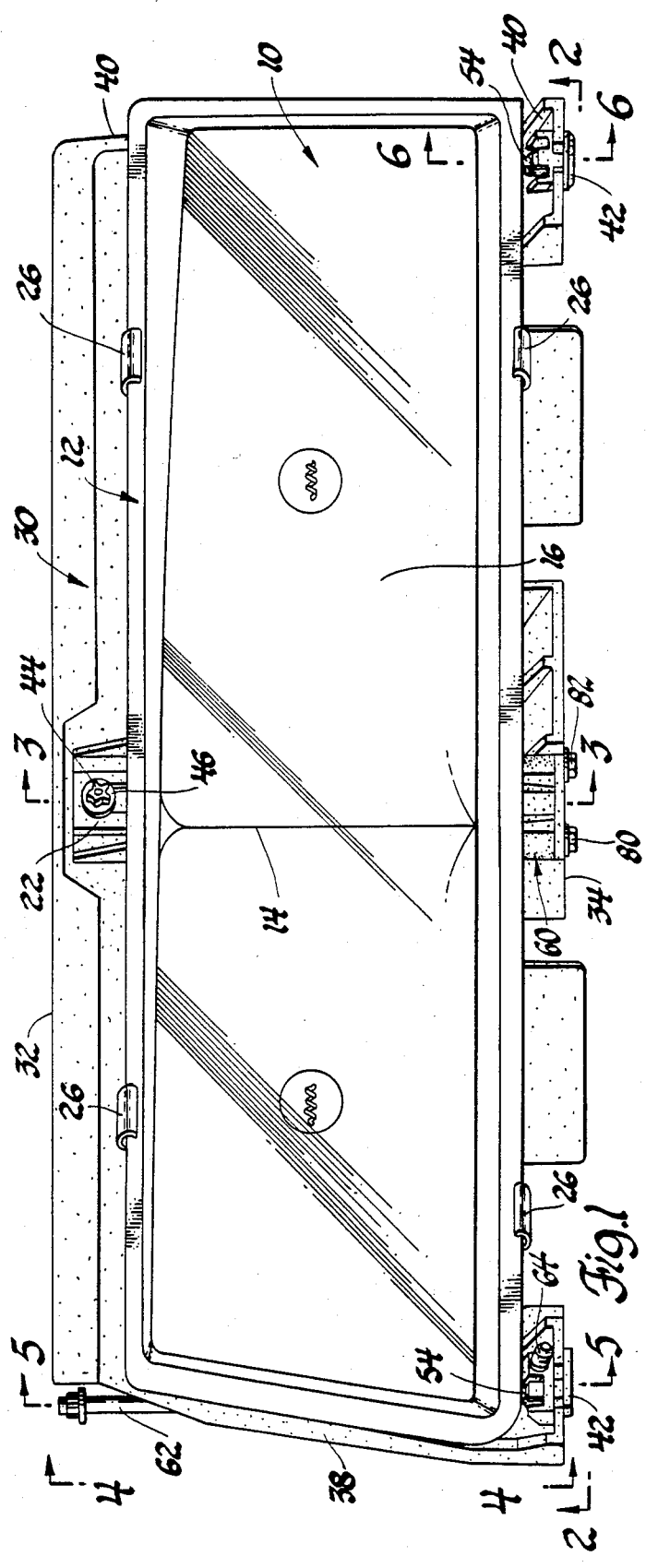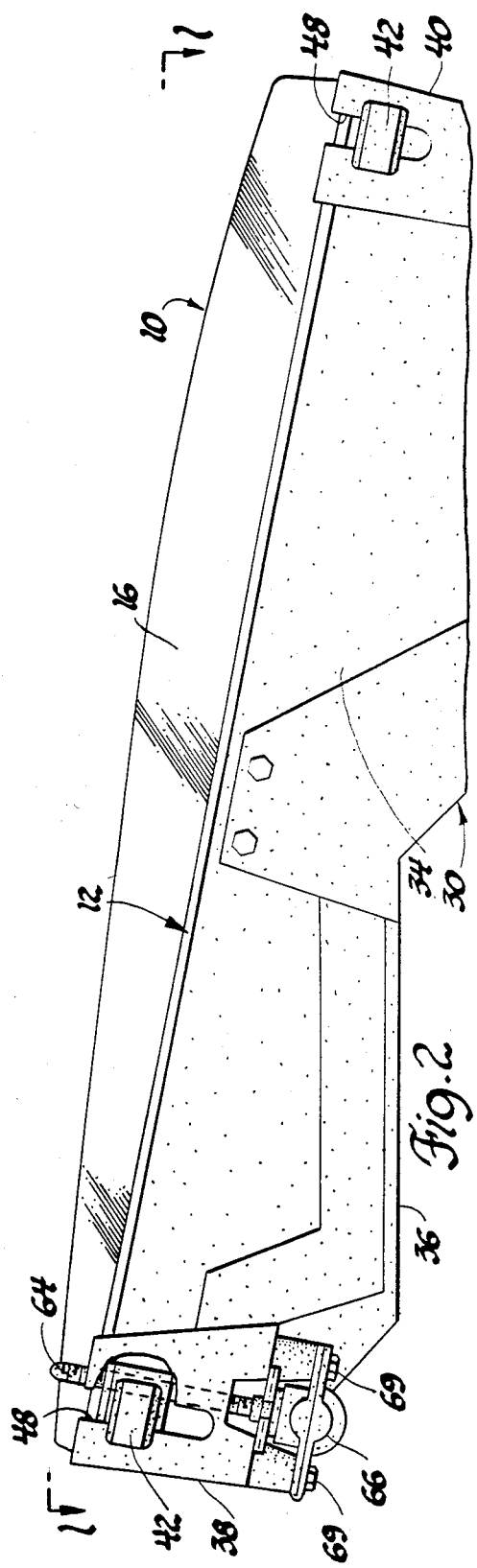

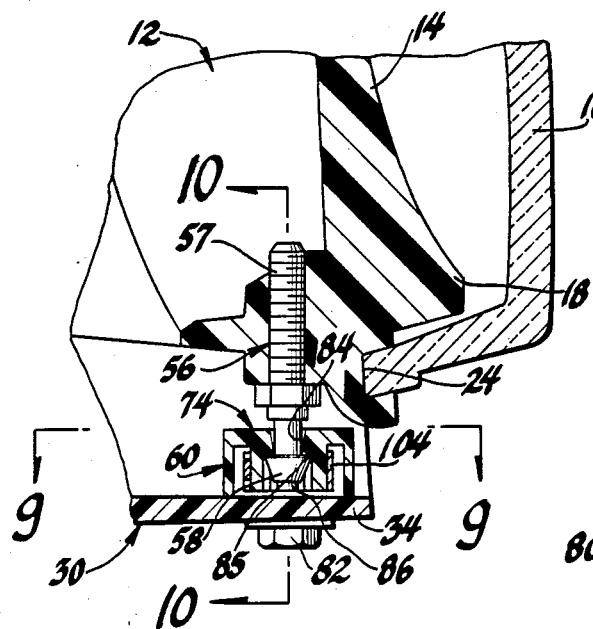
Fig. 8
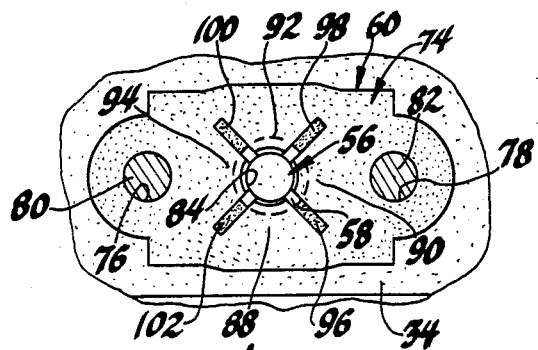
Fig. 9
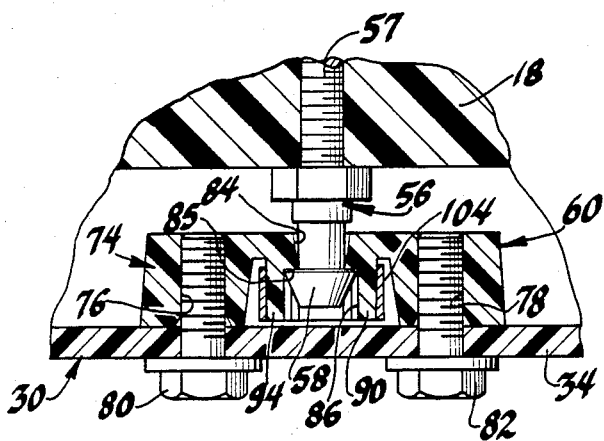
Fig. 10
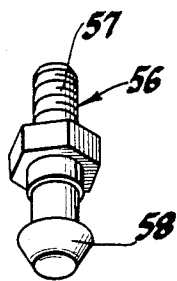
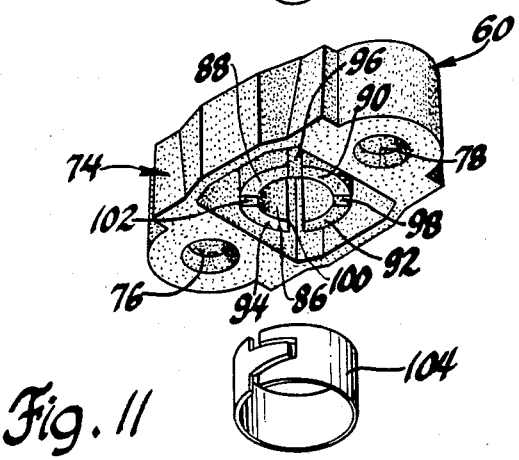
Fig. 11

VEHICLE HEADLAMP ASSEMBLY

This invention relates to vehicle lamps and more particularly to aim-adjustable vehicle headlamps.

Copending patent application, U.S. Ser. No. 824,197, filed Jan. 30, 1986 in the name of McMahan et al and assigned to the assignee of this invention discloses a headlamp assembly incorporating an improved adjustment arrangement in which manipulations of aiming adjusters may take place at any location about the margin of the lamp from the front, side or rear, at the selection of the designer, to satisfy whatever styling or structural concerns which may dominate. For example, while it is also known to provide threaded adjusters manipulatable from the rear of the headlamp in the engine compartment, it is often true that the crowding of internal hardware inhibits applying a hand tool onto the adjuster to satisfactorily accomplish the adjustment. The invention covered by the aforesaid application features adjustment apparatus that avoids such dilemmas by enabling such interior placement of adjusters, if desired, yet with an increased flexibility of orientation suited to the convenient use of tools.

The present invention is applicable to a headlamp assembly of the above type and is specifically intended for use with a lamp assembly having a support frame provided with opposed horizontally orientated walls between which a rectangular lamp body is received with the lower opposed corners thereof being supported by universally pivotable means so that the lamp body is adjustable about a horizontal axis. The lamp assembly according to the present invention also includes upper pivot means and lower pivot means aligned along a vertical axis about which the lamp body is rotatably adjustable. The lower pivot means is characterized in that it comprises a pivot seat member and a pivot stud the former of which includes a block member made of a plastic material and having a stepped bore with a shoulder formed within the block member for receiving a conical head formed on one end of the pivot stud. The stepped bore is defined by segmented sections integral with the block member and the arrangement is such that when the conical head is inserted into the bore, the segmented sections flex radially outwardly and, after the conical head moves beyond the shoulder of the stepped bore, the segmented sections return to the normal position to retain the conical head within the bore.

These and other features and advantages of the invention will be apparent from the following specification and from the drawings wherein:

FIG. 1 is a front elevational view of a vehicle headlamp assembly according to the invention;

FIG. 2 is a bottom view, partially broken away, taken along the plane indicated 2—2 in FIG. 1;

FIG. 8 is an enlarged view of the lower pivot means shown in FIG. 3;

FIG. 9 is an enlarged plan view taken along the line 9—9 of FIG. 8;

FIG. 10 is an enlarged sectional view taken along line 10—10 of FIG. 8; and

FIG. 11 is an exploded isometric view of the various parts of the lower pivot means shown in FIGS. 8-10.

Figure 3:
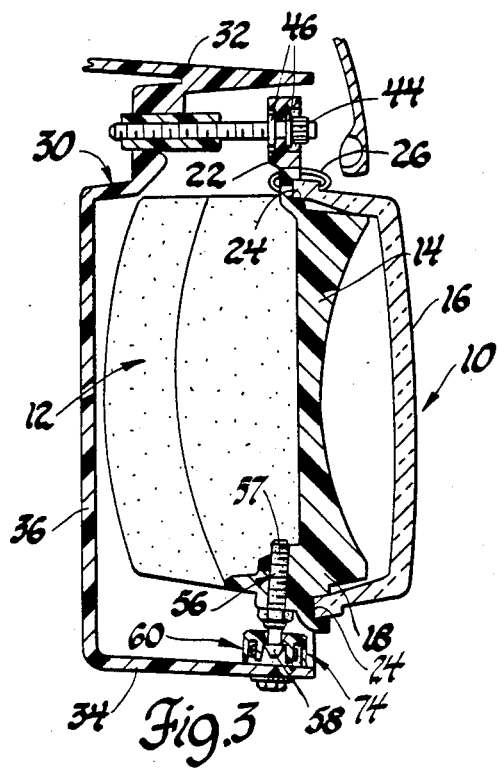
FIG. 3 is a sectional view taken along the plane indicated 3—3 in FIG. 1.
Figure 4:
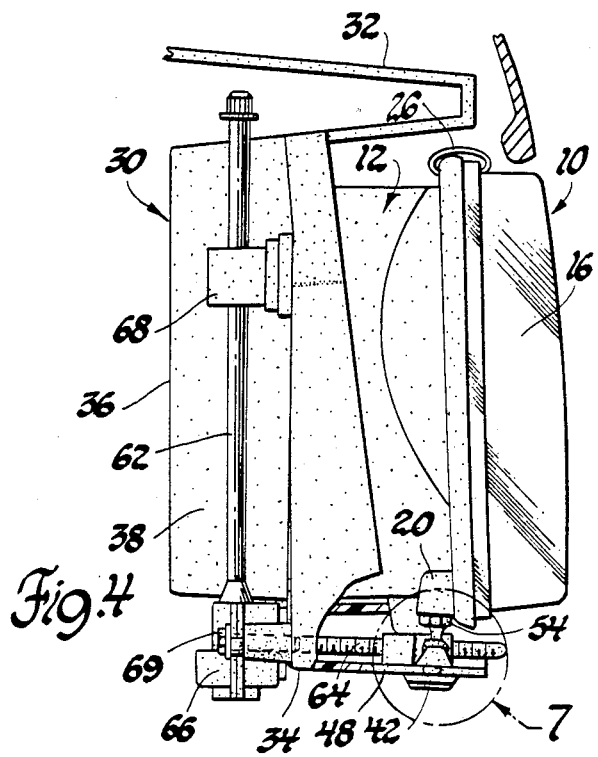
FIG. 4 is an end view taken along the plane indicated 4—4 in FIG. 1.

Referring now to FIGS. 1-3 of the drawings, the same illustrate an exemplary embodiment of the so-called styled headlamp variety for upscale automotive vehicle bodies. Such assembly includes a rectangular headlamp body 10, comprised of an elongated, dish-like, multiple cavity reflector member 12, the cavities of which may be separated by a web or webs 14, and the open front face of which is covered by a glass or like material lens element 16. As viewed best in FIG. 3, the reflector member 12 may be molded of a suitable polymer, particularly to include a variety of thickened portions for provision of mounting details as will be described. Such thickened portions include a region 18 at the lower margin of the reflector member 12 adjacent web 14, and similar such regions 20, FIG. 4, at opposite lateral ends of the reflector member 12. Reverting to FIG. 3, another thickened flange area 22 is provided above the web 14. Suitable grooving or channeling, as at 24, is provided around the entire margin of the open face of the reflector member 12 to receive the flange like margins of the lens 16. An adhesive and sealant such as butyl may be added at the inner face of the lens flange to prevent the ingress of foreign material and the lens is retained on the reflector member 12 by such means as clips 26. Conventional lamp bulbs may be provided, as is well known, in each of the several reflector cavities for low beam, high beam or parking lamp illumination selected at the will of the driver.

As also seen in FIGS. 1-3 the headlamp assembly includes a box-like support frame, generally designated as 30. This frame 30 may also be fabricated of a polymer material molded to a shape, such as shown, preferably providing spaced horizontally extending upper and lower walls 32 and 34, respectively, joined by a back wall 36 and by opposite end walls 38 and 40. Frame 30 is suitably affixed to the front body structure, not shown, of the vehicle body by whatever conventional means desired.

Figure 7:
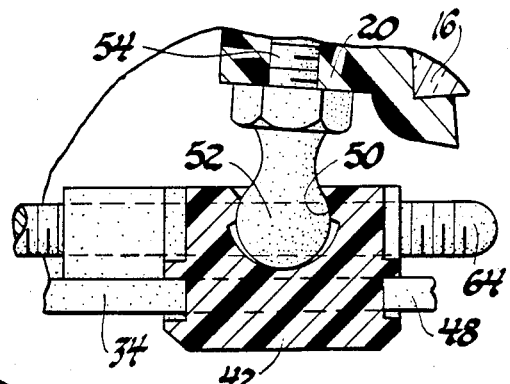
FIG. 7 is an enlarged view, partially in section, of a portion of FIG. 4.
Figure 6:
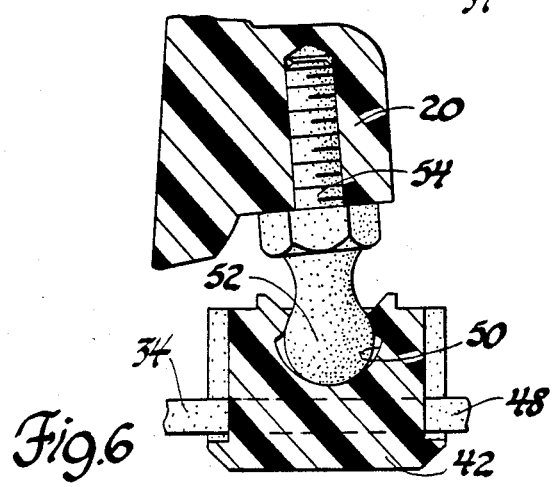
FIG. 6 is an enlarged sectional view taken along the plane indicated 6—6 in FIG. 1.

The lamp body 10 is in turn mounted on support frame 30 by a pair of slidable support shoes 42, seen best in detail in FIGS. 2, 6 and 7, as well as by an upper adjustable fastener 44. Fastener 44 is a threaded element having a head suitably tooled for reception of a hand adjusting device, such as a screwdriver, and having a threaded shank screwed into a thickened portion of the back wall 36 of the frame 30. The head portion of the fastener 44 has spaced shoulders 46 which capture the wall in region 22 of the reflector member 12. The fastener 44 is, in the illustrated case, accessible from the front of the vehicle and normally hidden, for example, by the lower marginal edge of the lip of the vehicle hood. It might alternatively be reversed for access from the rear, with the hood open and properly mounted to flange 22.

Referring to FIG. 2, and to FIGS. 6 and 7, the lower wall 34 of frame 30 is slotted at the end regions thereof as at 48 to receive the support shoes 42. Each support shoe 42 is of molded polymer with integral upper and lower portions embracing in the channel-like gaps therebetween the thickness of the slotted lower wall 34 at each location. The upper portion of each such support shoe 42 is molded with a socket-like recess 50 receiving ball head 52 of a ball stud 54 having a threaded shank screwed into each of the opposite thickened regions 20, respectively, of reflector member 12.

The two ball heads 52 of the ball studs are located in a horizontal plane of the support frame 30 and together through their centers define an instantaneous axis of rotation for aiming adjustment of the lamp body 10 about a horizontal axis in vertical planes. Such adjustment is of course effected by manipulated rotation of fastener 44 by a screwdriver or the like.

Aiming or adjustment of lamp body 10 in the horizontal planes, on the other hand, about a vertical axis is effected by manipulation of one of the shoes 42. The vertical axis for such horizontal adjustment is established by the shouldered head of upper fastener 44 and a lower pivot means which includes a pivot stud 56. Such pivot stud 56, seen best in FIGS. 3, 8, and 10, includes a threaded shank 57 screwed into the thickened portion 18 of the reflector member 12 and a frusto-conical or bullet-shaped head 58 which is adapted to be pushed through a stepped bore into a cavity of a polymeric molded pivot seat 60 secured to the lower wall 34 of the frame at a location vertically aligned with fastener 44 and along the aforesaid horizontal axis passing through the centers of ball head 52. The head 58 is simply held laterally for rotation in such pivot seat 60 such that, together with the head of upper fastener 44, it defines the vertical axis of headlamp adjustment while also being at the horizontal adjustment axis so that it offers no impediment thereto to adjustable movement thereabout.

Figure 5:
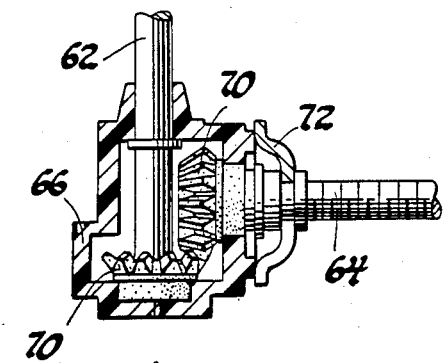
FIG. 5 is an enlarged sectional view taken along the plane indicated 5—5 in FIG. 1.

As earlier mentioned, support shoes 42 are slidable within slots 48 of frame 30 to provide for adjustment of the lamp body. The slots 48 may of course be aligned generally on circular arcs centered on the vertical axis through pivot seat 60, or on tangents thereto as might be accommodated by slight amounts of play, as between the shoes and the lower wall 34 of the frame, for example. Adjustment is effected by an angularly arranged adjustment apparatus, seen best in FIGS. 4 and 5. The present embodiment illustrates one case of a desired orientation for the apparatus, including a pair of orthogonally arranged shafts 62 and 64 which are interconnected in a housing 66. The vertical shaft 62 has a head located adjacent the upper wall 32 of the support frame at a location easily manipulated by a hand screwdriver or the like, and arranged for rotation within a support clip 68 attached to back wall 36 of the frame. The lower end of shaft 62 extends into the gear housing 66 which is likewise suitably attached to the back wall as by screws 69. As seen best in FIG. 5, the lower end of shaft 62 has mounted thereto one of a pair of bevel gears 70 which are meshed and suitably journaled in circular recesses of the gear housing 66. The other of the bevel gears 70 is mounted at the internal end of the other shaft 64 and the gears are held in meshing engagement by means of a spring clip 72 inserted between a wall of the gear housing and a shoulder of shaft 64. As illustrated, the shaft 64 has the majority of its length threaded, and as seen best in FIG. 7, such threaded length of the shaft is engaged in a threaded bore of the upper portion of a shoe 42.

Thus, a selected rotation by a screwdriver or the like applied to the head of shaft 62 will cause rotation of the lower threaded shaft 64 within in its gear housing 66, resulting in a sliding adjustment of the engaged support shoe 42 and its opposite member fore or aft in their slots 48, so that the headlamp body 10 is adjusted or aimed relative to frame 30 about the vertical axis provided by the lower pivot means (which includes the pivot stud 56) and the upper pivot means (which includes the fastener 44). Regarding the lower pivot means it can be seen in FIGS. 8-11, that the pivot seat 60 of the lower pivot means takes the form of a block member 74 made of a plastic material the opposite ends of which are formed with a pair of apertures 76 and 78. A pair of self tapping screws 80 and 82 are located in the apertures 76 and 78, respectively, for securing the block member to the lower wall 34 of the frame 30. As aforementioned, the block member 74 is also formed with a centrally located stepped bore the upper end of which has a tapered cylindrical inner wall 84 that terminates at a shoulder 85 and connects with an enlarged cylindrical cavity 86 of uniform cross section. Both the inner wall 84 and the cavity 86 are defined by four identical sections 88, 90, 92 and 94 which are circumferentially separated from each other by the cross slots 96, 98, 100, and 102. Thus, the upper ends of each of the sections 88-94 are integral and attached to the top of the block member 74 while the lower portion of the segments 88-94 are in the form of a skirt depending from the top of the block member 74. A ring type spring member 104 surrounds the sections 88-94 and serves to normally maintain the sections 88-94 in the full line position shown in FIGS. 8-10.

During assembly of the lamp body 10 to the frame 30, the head 58 of the pivot stud 56 is pushed through the pivot seat members 60 central opening defined by the tapered wall 84 causing the segmented sections 88-94 to flex radially outwardly against the bias of spring member 104 until the head 58 moves beyond the shoulder 85 and is located in the position of FIGS. 8 and 10. The spring member 104 then serves to maintain the sections 88-94 in the normal position for retaining the head 58 within the cavity 86.

It will be noted that the ball and socket connections provided by the support shoes 42 serve as the load bearing members for the lamp body 10 on the frame 30. The lower pivot means comprising the pivot seat 60 and the pivot stud 56 does not serve to support the weight of the lamp body 10, but merely serves as a control member about which the lamp body 10 can rotate when shaft 62 or the fastener 44 is rotated.

Various changes and modifications can be made in this construction without departing from the spirit of the invention. Such changes are contemplated by the inventors and they do not wish to be limited except by the scope of the appended claims.

The embodiments of the invention in which an exclusive property or privilege is claimed are defined as follows:

1. In combination with a vehicle lamp assembly having a support frame with opposed walls, a rectangular lamp body received between said frame walls and having the lower opposed corners of said lamp body provided with ball and socket means for supporting the lamp body for adjustable movement about a horizontal axis, and upper pivot means and lower pivot means on said frame walls and said lamp body aligned on a vertical axis about which said lamp body is adapted for rotatable adjustment relative to said frame, said vertical axis being located between said ball and socket means and said upper pivot means including a threaded fastener adapted to adjust the position of said lamp body about said horizontal axis, said lower pivot means being non-load supporting and comprising a pivot seat member and a pivot stud, said pivot stud having a frusto-conical head formed at one end and a threaded shank at the other end, said pivot seat member including a block member made of a plastic material and having a stepped bore with a shoulder formed therein for receiving said conical head of said pivot stud, said stepped bore being formed by segmented sections integral with said block member adapted to flex radially outwardly when said conical head is inserted into said bore and return to the normal position for retaining the conical head within the bore when said conical head moves beyond said shoulder, and a spring member surrounding said segmented sections for preventing removal of said conical head from said bore.

2. In combination with a vehicle lamp assembly having a support frame with opposed walls, a rectangular lamp body received between said frame walls and having the lower opposed corners of said lamp body provided with ball and socket means for supporting the lamp body for adjustable movement about a horizontal axis, and upper pivot means and lower pivot means on said frame walls and said lamp body aligned on a vertical axis about which said lamp body is adapted for rotatable adjustment relative to said frame, said vertical axis being located between said ball and socket means and said upper pivot means including a threaded fastener adapted to adjust the position of said lamp body about said horizontal axis, said lower pivot means being non-load supporting and comprising a pivot seat member and a pivot stud, said pivot stud having a frusto-conical head formed at one end and a threaded shank at the other end, said pivot seat member including a block member made of a plastic material and having a stepped bore with a shoulder formed therein for receiving said conical head of said pivot stud, the upper portion of said stepped bore above said shoulder being tapered and the lower portion of said stepped bore below said shoulder being of uniform cross section, said stepped bore being defined by segmented sections integral with said block member adapted to flex radially outwardly when said conical head is inserted into said bore and return to the normal position for retaining the conical head within the bore when said conical head moves beyond said shoulder, and a spring member surrounding said segmented sections for preventing removal of said conical head from said bore.

3. In combination with a vehicle lamp assembly having a support frame with opposed walls, a rectangular lamp body received between said frame walls and having the lower opposed corners of said lamp body provided with ball and socket means for supporting the lamp body for adjustable movement about a horizontal axis, and upper pivot means and lower pivot means on said frame walls and said lamp body aligned on a vertical axis about which said lamp body is adapted for rotatable adjustment relative to said frame, said vertical axis being located between said ball and socket means and said upper pivot means including a threaded fastener adapted to adjust the position of said lamp body about said horizontal axis, said lower pivot means being non-load supporting and comprising a pivot seat member and a pivot stud, said pivot stud having a frusto-conical head formed at one end and a threaded shank at the other end, said pivot seat member including a block member made of a plastic material and having a stepped bore with a shoulder formed therein for receiving said conical head of said pivot stud, the portion of said stepped bore above said shoulder being tapered and the portion of said stepped bore below said shoulder being of uniform cross section, said stepped bore being formed by segmented sections integral with said block member adapted to flex radially outwardly when said conical head is inserted into said bore and return to the normal position for retaining the conical head within the bore when said conical head moves beyond said shoulder, and a ring like spring member surrounding said segmented sections for biasing said sections radially inwardly so as to prevent removal of said conical head from said bore.

* * * * *